United States Patent
Horiuchi

(10) Patent No.: US 10,046,606 B2
(45) Date of Patent: Aug. 14, 2018

(54) RUN-FLAT TIRE

(71) Applicant: The Yokohama Rubber Co., LTD., Minato-ku, Tokyo (JP)

(72) Inventor: Kenji Horiuchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 391 days.

(21) Appl. No.: 14/777,223

(22) PCT Filed: Feb. 26, 2014

(86) PCT No.: PCT/JP2014/054628
§ 371 (c)(1),
(2) Date: Sep. 15, 2015

(87) PCT Pub. No.: WO2014/141880
PCT Pub. Date: Sep. 18, 2014

(65) Prior Publication Data
US 2016/0031267 A1     Feb. 4, 2016

(30) Foreign Application Priority Data

Mar. 15, 2013  (JP) .................................. 2013-053424

(51) Int. Cl.
*B60C 17/00* (2006.01)
*B60C 11/03* (2006.01)
(Continued)

(52) U.S. Cl.
CPC ............ *B60C 11/0304* (2013.01); *B60C 5/00* (2013.01); *B60C 9/14* (2013.01); *B60C 11/0327* (2013.01);
(Continued)

(58) Field of Classification Search
CPC ............ B60C 11/0304; B60C 17/0009; B60C 17/0018; B60C 17/0027
(Continued)

(56) References Cited

U.S. PATENT DOCUMENTS

2009/0178745 A1* 7/2009 Ikegami ............. B60C 11/0309
152/209.8
2010/0139826 A1    6/2010 Matsumoto
(Continued)

FOREIGN PATENT DOCUMENTS

DE    10 2011 075 940    11/2011
DE    10 2011 083 520    3/2012
(Continued)

OTHER PUBLICATIONS

International Search Report for Application No. PCT/JP2014/054628 dated Apr. 28, 2014, 4 pages, Japan.

*Primary Examiner* — Robert C Dye
(74) *Attorney, Agent, or Firm* — Thorpe North & Western

(57) ABSTRACT

In a side reinforced type run-flat tire, a relationship between a distance (Do) from a center position of a circumferential primary groove that is positioned outermost in the tire width direction in a vehicle outer side region to a tire equatorial plane and a rim width (Wr) is such that $0.20 \leq Do/Wr \leq 0.30$, and a relationship between a distance (Di) from a center position of a circumferential primary groove that is positioned outermost in the tire width direction in a vehicle inner side region to the tire equatorial plane and the rim width (Wr) is such that $0.25 \leq Di/Wr \leq 0.35$.

9 Claims, 4 Drawing Sheets

(51) Int. Cl.
*B60C 9/14* (2006.01)
*B60C 11/04* (2006.01)
*B60C 13/00* (2006.01)
*B60C 5/00* (2006.01)
*B60C 15/06* (2006.01)

(52) U.S. Cl.
CPC .............. *B60C 11/04* (2013.01); *B60C 13/00* (2013.01); *B60C 15/0603* (2013.01); *B60C 17/00* (2013.01); *B60C 17/0009* (2013.01); *B60C 2011/0353* (2013.01); *B60C 2013/007* (2013.01); *B60C 2015/0614* (2013.01); *B60C 2017/0063* (2013.01); *B60C 2017/0072* (2013.01)

(58) Field of Classification Search
USPC ....................................................... 152/209.8
See application file for complete search history.

(56) References Cited

U.S. PATENT DOCUMENTS

2011/0284143 A1   11/2011   Horiuchi
2012/0073718 A1   3/2012    Horiuchi
2012/0118455 A1*  5/2012    Hada .................. B60C 11/0304
                                                152/209.8
2012/0132334 A1*  5/2012    Nomura .............. B60C 11/0304
                                                152/209.8
2012/0132338 A1   5/2012    Horiuchi
2013/0037193 A1   2/2013    Horiuchi

FOREIGN PATENT DOCUMENTS

| DE | 10 2011 086 501 | 5/2012 |
| DE | 10 2012 201 878 | 8/2012 |
| JP | H07-304312 | 11/1995 |
| JP | 2007-290407 | 11/2007 |
| JP | 2008-018783 | 1/2008 |
| JP | 2008-296873 | 12/2008 |
| JP | 2009-061866 | 3/2009 |
| JP | 2009-126409 | 6/2009 |
| JP | 2010-132236 | 6/2010 |
| JP | 2012-096656 | 5/2012 |
| JP | 2012-116212 | 6/2012 |
| WO | WO 2008/007555 | 1/2008 |
| WO | WO 2014/042035 | 3/2014 |

* cited by examiner

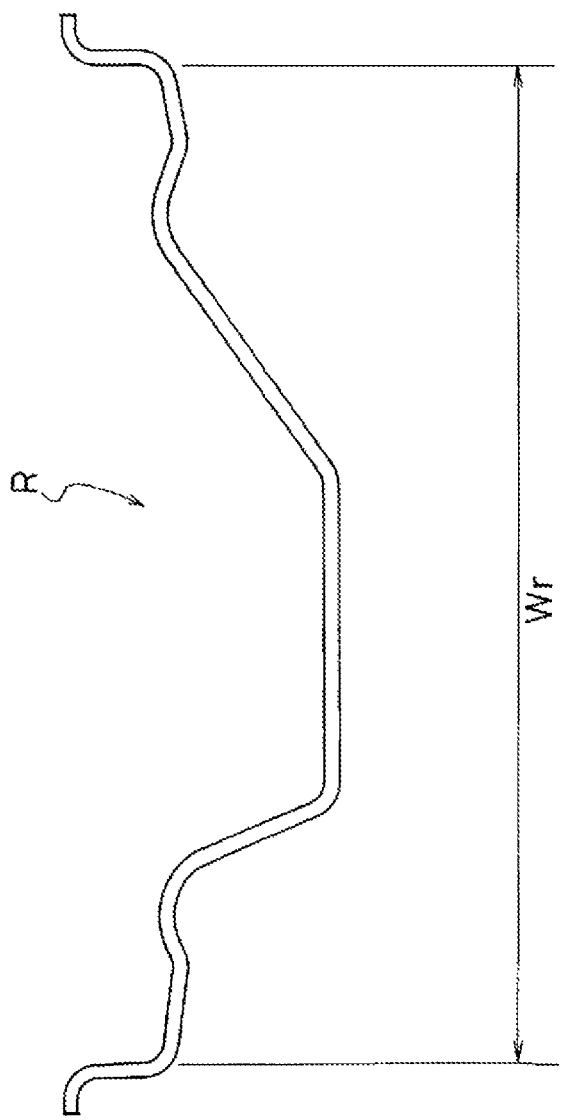

US 10,046,606 B2

RUN-FLAT TIRE

TECHNICAL FIELD

The present technology relates to a side reinforced type run-flat tire, and more specifically relates to a run-flat tire that can achieve to a high degree both durability during run-flat traveling and ride comfort during regular traveling and that can improve steering stability during regular traveling.

BACKGROUND

Conventionally, as a run-flat tire that can travel during a punctured condition, a side reinforced type run-flat tire has been proposed (see, for example, Japanese Unexamined Patent Application Publication Nos. H07-304312A and 2008-296873A) that has a side reinforcing layer having a falcated cross-sectional shape disposed on the inner side of the side wall portion.

With this type of side reinforced type run-flat tire, it is common that the thickness of the side reinforcing layer is made greater and a rubber composition having high hardness is used in the side reinforcing layer in order to increase durability during run-flat traveling.

However, when increasing the thickness of the side reinforcing layer and increasing hardness of the rubber composition that composes the side reinforcing layer, there is a problem in that ride comfort degrades during regular traveling in conjunction with the increase in rigidity of the side wall portion. Therefore, a way is sought to enhance durability during run-flat traveling without degrading ride comfort. Furthermore, if a spring constant of the tire is reduced in order to secure ride comfort, there is also a problem in that steering stability degrades during regular traveling.

SUMMARY

The present technology provides a run-flat tire that can achieve to a high degree both durability during run-flat traveling and ride comfort during regular traveling and that can improve steering stability during regular traveling.

A run-flat tire of the present technology having a designated mounting direction on a vehicle includes: an annular-shaped tread portion extending in a tire circumferential direction; a pair of side wall portions disposed on both sides of a tread portion; and a pair of bead portions disposed on inner sides in a tire radial direction of side wall portions. At least one carcass layer is mounted between the pair of bead portions, the carcass layer being wound from a tire inner side to a tire outer side around a bead core of each of the bead portions. A bead filler is disposed on an outer peripheral side of each bead core in each of the bead portions, a plurality of belt layers is disposed on an outer peripheral side of the carcass layer in the tread portion, and a side reinforcing layer having a falcated cross-sectional shape is disposed between the carcass layer and an inner liner layer in the side wall portion.

At least one circumferential primary groove that extends in the tire circumferential direction is disposed, respectively, in a vehicle outer side region and a vehicle inner side region of the tread portion that is divided with a tire equatorial plane as a boundary, a relationship between a distance Do from a center position of the circumferential primary groove that is positioned outermost in a tire width direction in the vehicle outer side region to the tire equatorial plane and a rim width Wr is such that $0.20 \le Do/Wr \le 0.30$, a relationship between a distance Di from the center position of a circumferential primary groove that is positioned outermost in the tire width direction in the vehicle inner side region to the tire equatorial plane and the rim width Wr is such that $0.25 \le Di/Wr \le 0.35$, a relationship between a groove width Wo of the circumferential primary groove that is positioned outermost in the tire width direction in the vehicle outer side region and a groove width Wi of the circumferential primary groove that is positioned outermost in the tire width direction in the vehicle inner side region is $0.80 \le Wo/Wi \le 0.90$, a relationship between a thickness Ga on a rim check line position of an outer side rubber portion positioned farther to the outer side than the carcass layer and a maximum thickness Gb in the side wall portion of the outer side rubber portion is such that $0.8 \times Gb \le Ga \le 1.0 \times Gb$; and a relationship between a thickness Gc on a rim check line position of an inner side rubber portion positioned farther to the inner side than the carcass layer and the thickness Ga on the rim check line position of the outer side rubber portion is such that $0.7 \times Ga \le Gc \le 1.0 \times Ga$.

As a result of diligent research on root causes of failure in run-flat tires, the present inventor reached the present technology by discovering that tire failure during run-flat traveling is mainly due to rupture of carcass cords generated in an area on which a rim flange abuts, and that providing appropriate deflection characteristics in the tire while avoiding this type of rupture in the carcass cords is a most effective method for improving durability, ride comfort and steering stability.

In other words, in the present technology, when at least one circumferential primary groove that extends in the tire circumferential direction is disposed, respectively, in a vehicle outer side region and a vehicle inner side region of the tread portion, taking into account a camber angle that is normally set within a range of 0 to −4.0 degrees, an asymmetrical structure is adopted in which a relationship between the distance Do from the center position of the circumferential primary groove that is positioned outermost in the tire width direction in the vehicle outer side region to the tire equatorial plane and the rim width Wr, a relationship between the distance Di from the center position of the circumferential primary groove that is positioned outermost in the tire width direction in the vehicle inner side region to the tire equatorial plane and the rim width Wr, and a relationship between the groove width Wo of the circumferential primary groove that is positioned outermost in the tire width direction in the vehicle outer side region and the groove width Wi of the circumferential primary groove that is positioned outermost in the tire width direction in the vehicle inner side region are specified. By combining this type of asymmetrical structure with dimension specifications of a rim cushion that will be described later, it is possible to prevent buckling of the tread portion during run-flat traveling and furthermore, it is possible to prevent heat build-up of the rim cushion. The durability during run-flat traveling can be thereby improved. Furthermore, by making the groove width Wo of the circumferential primary groove that is positioned outermost in the tire width direction in the vehicle outer side region smaller than the groove width Wi of the circumferential primary groove that is positioned outermost in the tire width direction in the vehicle inner side region, an effect is obtained of improving steering stability during regular traveling.

Furthermore, setting the thickness Ga in the rim check line position of the outer side rubber portion positioned farther to the outer side than the carcass layer to be sufficiently great relative to the maximum thickness Gb in the side wall portion of the outer side rubber portion thereof can avoid local stress concentration on the carcass cords configuring the carcass layer, and prevent rupture of the carcass cords in the rim cushion portion. The durability during run-flat traveling can be thereby improved. Furthermore, because increasing the thickness Ga in the rim check line position of the outer side rubber portion reduces shock and vibration transferred from the tire through the rim, an effect of enhancing the ride comfort during regular traveling can be obtained.

Furthermore, setting the thickness Gc in the rim check line position of the inner side rubber portion positioned farther to the inner side than the carcass layer to be sufficiently great relative to the thickness Ga in the rim check line position of the outer side rubber portion can reduce shear stress at work in the carcass layer, and improve the durability during run-flat traveling. Furthermore, when the thickness Gc on the rim check line position of the inner side rubber portion is made larger, the rubber volume of a location at which deformation caused by input from the rim is large is sufficiently secured, and thus an effect is obtained of improving ride comfort during regular traveling.

In the present technology, it is preferable that a minimum wall thickness portion in a range from a center position of the tread portion to a tire maximum width position is disposed between an end portion of each of the belt layers and a position at 70% of a tire cross-sectional height SH, a relationship between a thickness Gmin of the minimum wall thickness portion and a thickness Gmax of a maximum wall thickness portion in the side wall portion is such that $0.5 \times Gmax \leq Gmin \leq 0.8 \times Gmax$, and a relationship between a length Lmin on a tire outer surface in a tire meridian cross-section of a thin wall region where a wall thickness difference to the minimum wall thickness portion is 1 mm or less and the tire cross-sectional height SH is such that $0.18 \times SH \leq Lmin \leq 0.26 \times SH$. Thus arranging the minimum wall thickness portion in a range from the center position of the tread portion to the tire maximum width position between the end portion of each of the belt layers and the position at 70% of the tire cross-sectional height SH and providing the thin wall region associated therewith can improve the ride comfort during regular traveling, and prevent buckling of the tread portion during run-flat traveling, and furthermore, proactively deflecting a buttress portion during run-flat traveling can reduce strain on the rim cushion portion on which the rim flange abuts. An effect of simultaneously improving the ride comfort during regular traveling and the durability during run-flat traveling can be thereby achieved.

It is preferred that a tan δ of a rubber composition composing the bead filler is from 0.03 to 0.08 at 60° C. and that a JIS (Japan Industrial Standard)-A hardness of a rubber composition composing the bead filler is from 68 to 74 at 20° C. In addition, it is preferable that an additional reinforcing layer be embedded in the outside of the carcass layer in the side wall portion, that a tan δ of a rubber composition composing the additional reinforcing layer is from 0.01 to 0.08 at 60° C., and that a JIS-A hardness of the rubber composition composing the additional reinforcing layer is from 68 to 80 at 20° C. Making the tan δ and the JIS-A hardness of these tire configuration members appropriate can achieve both the durability during run-flat traveling and the ride comfort during regular traveling to a high degree.

In the present technology, the rim width Wr refers to a rim width of a standard rim prescribed by a standard prescribed for the tire. The tire cross-sectional height SH is a height measured by a measurement method for tire dimensions determined by a standard prescribed for the tire. On the other hand, various dimensions which do not include the tire cross-sectional height SH are dimensions measured from a cut sample taken along the tire meridian. The center position of the circumferential primary groove is a center position in the width direction of the circumferential primary groove on a road contact surface of the tread portion. Furthermore, the groove width of the circumferential primary groove is a groove width of the circumferential primary groove on the road contact surface of the tread portion and is an average value of the tire circumferential direction when there are fluctuations in the groove width.

Furthermore, in the present technology, tan δ is measured using a viscoelastic spectrometer (manufactured by Toyo Seiki Seisaku-sho, Ltd.) under the conditions of 20 Hz frequency, 10% initial strain, ±2% dynamic strain, and a temperature of 60° C. in accordance with JIS-K6394. JIS-A hardness is the durometer hardness measured in accordance with JIS K-6253 using a type A durometer and under a temperature of 20° C.

BRIEF DESCRIPTION OF THE DRAWINGS

FIG. 4 is a meridian cross-sectional view illustrating a standard rim applied to the run-flat tire according to the embodiment of the present technology.

DETAILED DESCRIPTION

Figure 1:
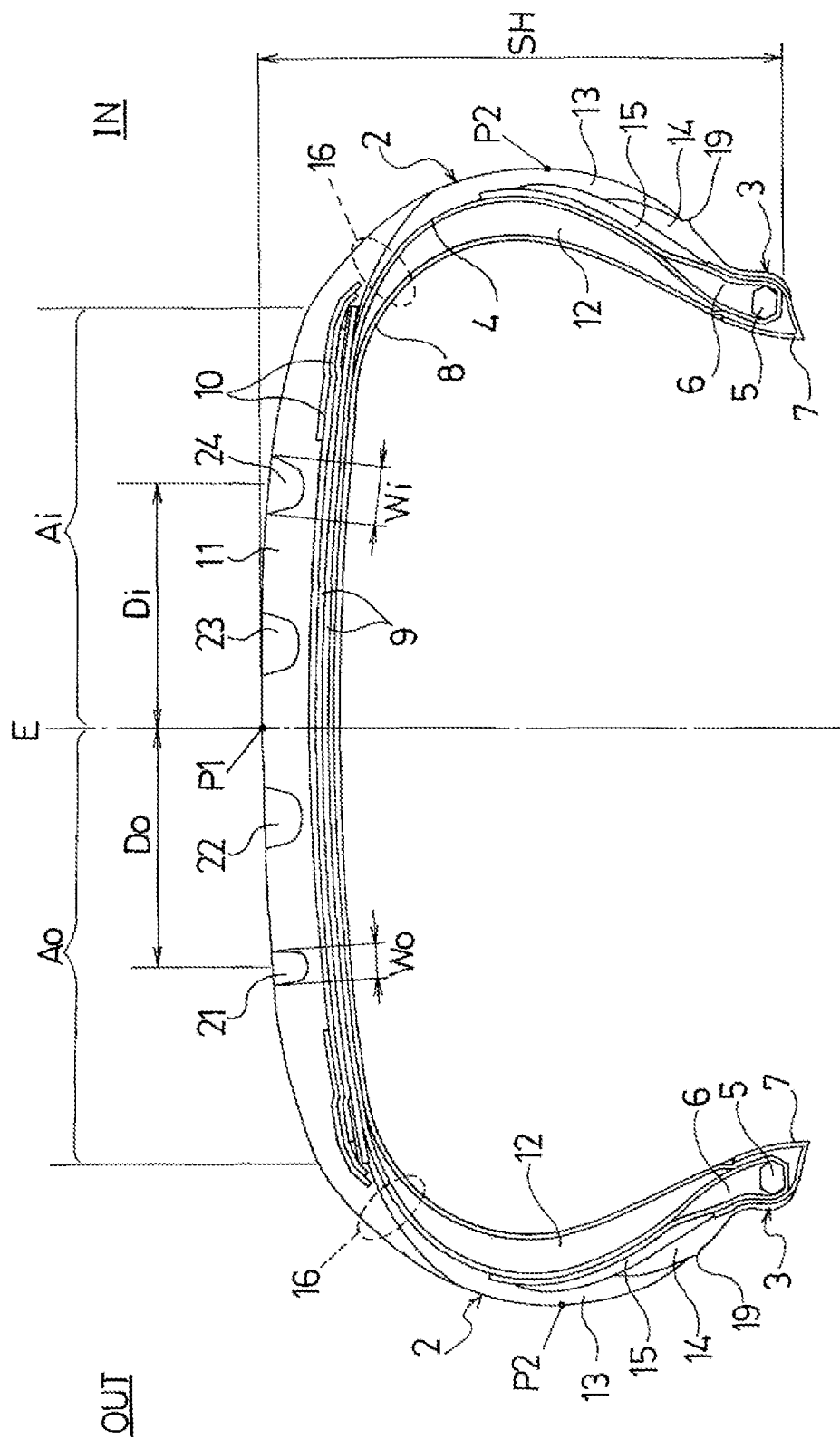
FIG. 1 is a meridian cross-sectional view illustrating a run-flat tire according to an embodiment of the present technology.
Figure 2:
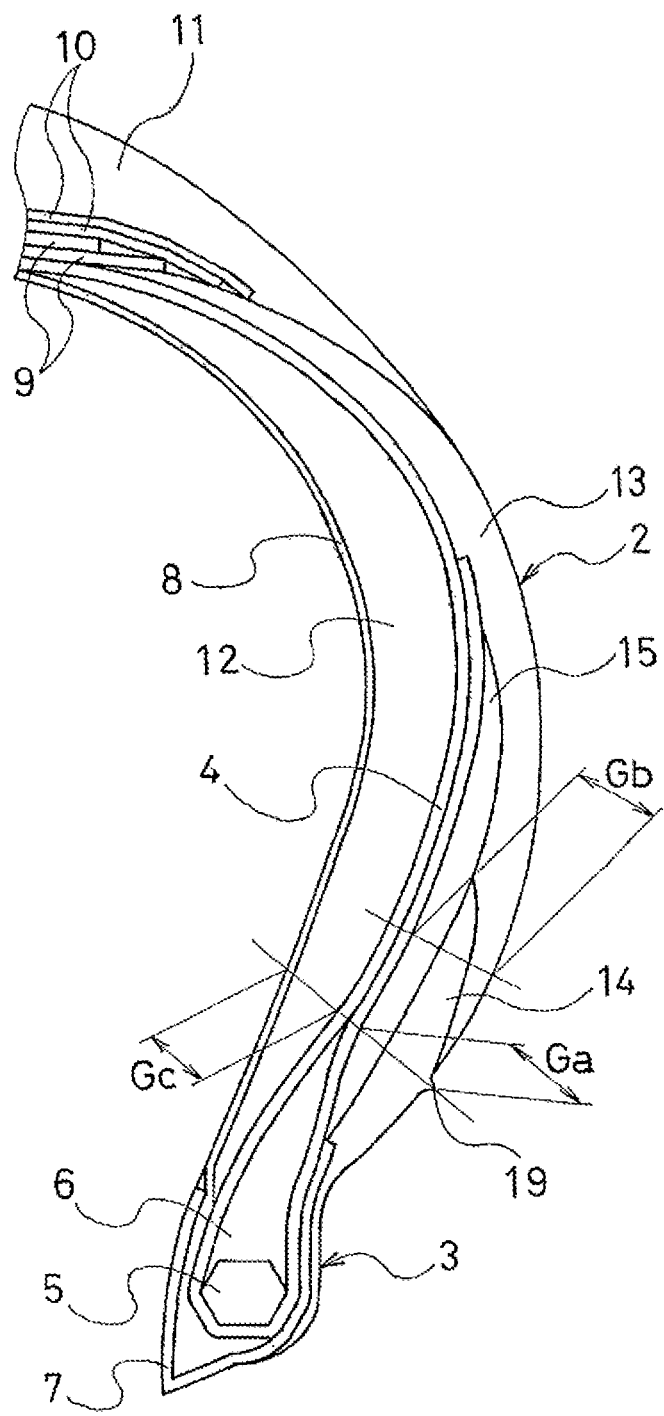
FIG. 2 is a cross-sectional view illustrating main parts of the run-flat tire of FIG. 1.
Figure 3:
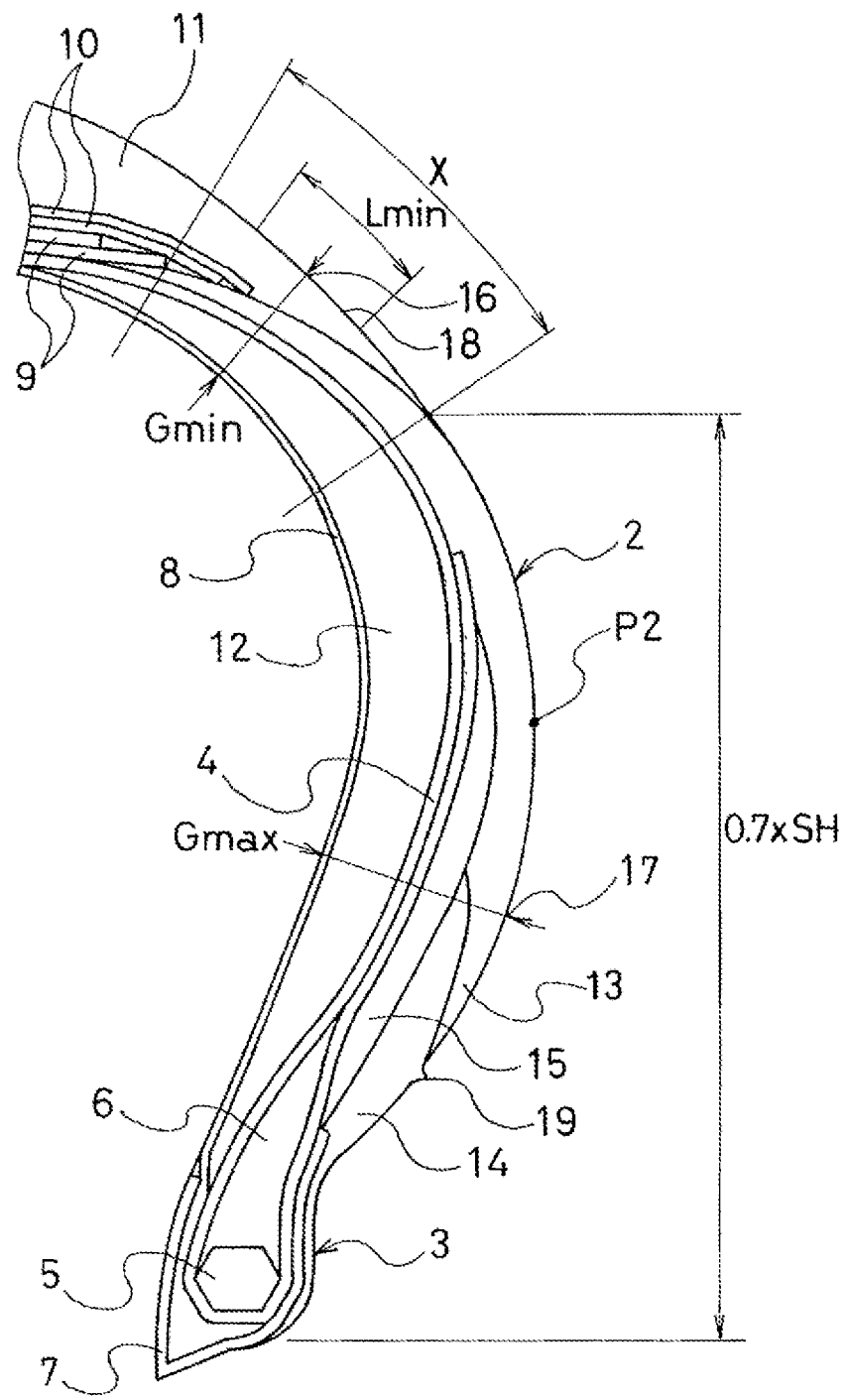
FIG. 3 is another cross-sectional view illustrating the main parts of the run-flat tire of FIG. 1.

The following is a detailed description of the configuration of the present technology with reference to the accompanying drawings. FIG. 1 to FIG. 3 illustrate a run-flat tire according to an embodiment of the present technology, and FIG. 4 illustrates a standard rim R that is applied to the run-flat tire. The above-described run-flat tire is a tire having a designated mounting direction on a vehicle. In FIGS. 1 and 4, "IN" refers to a vehicle inner side when mounted on a vehicle and "OUT" refers to a vehicle outer side when mounted on the vehicle.

As illustrated in FIG. 1, a run-flat tire of this embodiment is provided with an annular-shaped tread portion 1 extending in the tire circumferential direction, a pair of side wall portions 2 that are disposed on both sides of the tread portion 1, and a pair of bead portions 3 that are disposed on the inner side in the tire radial direction of the side wall portions 2.

At least one carcass layer 4 is mounted between the pair of bead portions 3. The carcass layer 4 includes a plurality of carcass cords oriented in the tire radial direction. The carcass layer 4 is wounded from the tire inner side to the tire outer side around a bead core 5 disposed in each of the bead portions 3. Organic fiber cords are preferably used as the carcass cords of the carcass layer 4. A bead filler 6 having a triangular cross-sectional shape is disposed on an outer circumferential side of each of the bead cores 5. Moreover, a chafer 7 is disposed on each bead portion 3 so as to encase the bead core 5. Furthermore, an inner liner layer 8 is disposed in a region between the pair of bead portions 3 on a tire inner surface.

A plurality of belt layers 9 is embedded on an outer circumferential side of the carcass layer 4 in the tread portion 1. These belt layers 9 include a plurality of reinforcing cords that incline with respect to the tire circumferential direction and the reinforcing cords are disposed so that the reinforcing cords of the different layers intersect each other. In the belt layers 9, an inclination angle of the reinforcing cords with respect to the tire circumferential direction is set in a range of, for example, 10° to 40°. Steel cords are preferably used as the reinforcing cords of the belt layers 9. For the purpose of enhancing high-speed durability, at least one belt cover layer 10 formed by arranging reinforcing cords at an angle of not more than 5° with respect to the tire circumferential direction, is disposed on an outer circumferential side of the belt layers 9. The belt cover layer 10 preferably has a jointless structure in which a strip material made from at least one reinforcing cord laid in parallel and covered with rubber is wound continuously in the tire circumferential direction. Also, the belt cover layer 10 can be disposed so as to cover the belt layer 7 in the width direction at all positions, or can be disposed to cover only the edge portions of the belt layer 9 to the outside in the width direction. Nylon, aramid, or similar organic fiber cords are preferably used as the reinforcing cords of the belt cover layer 10.

Furthermore, a tread rubber layer 11 is disposed on an outer side of the belt layer 9 and the belt cover layer 10 in the tread portion 1. A side reinforcing layer 12 having a falcated cross-sectional shape to enable run-flat traveling is disposed between the carcass layer 4 and an inner liner layer 8 in the side wall portion 2. A side wall rubber layer 13 is disposed on an outer side of the carcass layer 4 in the side wall portion 2. A rim cushion rubber layer 14 is disposed on an outer side of the carcass layer 4 in the bead portion 3. Furthermore, an additional reinforcing layer 15 is inserted between the carcass layer 4, and the side wall rubber layer 13 and the rim cushion rubber layer 14.

In the above-described run-flat tire, a plurality of circumferential primary grooves 21 to 24 that extend in a tire circumferential direction are formed in a vehicle outer side region Ao and a vehicle inner side region Ai of the tread portion 1, which is divided with a tire equatorial plane E as a boundary. In other words, the circumferential primary grooves 21 and 22 are disposed in the vehicle outer side region Ao of the tread portion 1, and the circumferential primary grooves 23 and 24 are disposed in the vehicle inner side region Ai of the tread portion 1. A groove width of these circumferential primary grooves 21 to 24 is in a range of 7.0 to 18.0 mm, and a groove depth thereof is in a range of 6.5 to 12.0 mm.

Here, a relationship between a distance Do from a center position of the circumferential primary groove 21 that is positioned outermost in the tire width direction in the vehicle outer side region Ao to the tire equatorial plane E and a rim width Wr (refer to FIG. 4), is set so that $0.20 \leq Do/Wr \leq 0.30$ and a relationship between a distance Di from a center position of the circumferential primary groove 24 that is positioned outermost in the tire width direction in the vehicle inner side region Ai to the tire equatorial plane E and the rim width Wr is set so that $0.25 \leq Di/Wr \leq 0.35$. More preferably, a relationship is obtained so that Di>Do.

Furthermore, a relationship between a groove width Wo of the circumferential primary groove 21 that is positioned outermost in the tire width direction in the vehicle outer side region Ao and a groove width Wi of the circumferential primary groove 24 that is positioned outermost in the tire width direction in the vehicle inner side region Ai is set so that $0.80 \leq Wo/Wi \leq 0.90$.

When the at least one circumferential primary groove that extends in the tire circumferential direction is disposed, respectively, in the vehicle outer side region Ao and the vehicle inner side region Ai of the tread portion 1 in this manner, by adopting an asymmetrical structure in which the relationship between the distance Do from the center position of the circumferential primary groove 21 that is positioned outermost in the tire width direction in the vehicle outer side region Ao to the tire equatorial plane E and the rim width Wr, the relationship between the distance Di from the center position of the circumferential primary groove 24 that is positioned outermost in the tire width direction in the vehicle inner side region Ai to the tire equatorial plane E and the rim width Wr, and the relationship between the groove width Wo of the circumferential primary groove 21 that is positioned outermost in the tire width direction in the vehicle outer side region Ao and the groove width Wi of the circumferential primary groove 24 that is positioned outermost in the tire width direction in the vehicle inner side region Ai are specified as described above, it is possible to prevent buckling of the tread portion 1 during run-flat traveling, and furthermore it is possible to prevent heat build-up of a rim cushion. As a result, it is possible to improve the durability during run-flat traveling. Furthermore, as the groove width Wo of the circumferential primary groove 21 that is positioned outermost in the tire width direction in the vehicle outer side region Ao is made smaller than the groove width Wi of the circumferential primary groove 21 that is positioned outermost in the tire width direction in the vehicle inner side region Ai, an effect is obtained of improving steering stability during regular traveling.

Here, if value of at least one of Do/Wr, Di/Wr, and Wo/Wi deviate from the above-described ranges, during run-flat traveling, buckling of the tread portion 1 occurs easily with the circumferential primary grooves 21 and 24 as bent portions, and furthermore, as strain becomes larger in the rim cushion, the heat build-up increases in the rim cushion, and thus the effect of improving the durability during run-flat traveling becomes insufficient.

In the run-flat tire described above, as illustrated in FIG. 2, an annular rim check line 19 that extends along the tire circumferential direction is formed in the vicinity of a boundary between the side wall portion 2 and the bead portion 3. This rim check line 19 is a line for confirming the fit of the rim, and is normally formed as a ridge that protrudes from the tire outer surface. A relationship between a thickness Ga on a rim check line position of an outer side rubber portion (side wall rubber layer 13, rim cushion rubber layer 14, and additional reinforcing layer 15) positioned farther to the outer side than the carcass layer 4 and a maximum thickness Gb in the side wall portion 2 of the outer side rubber portion is such that $0.8 \times Gb \leq Ga \leq 1.0 \times Gb$. Furthermore, a relationship between a thickness Gc on a rim check line position of an inner side rubber portion (inner liner layer 8 and side reinforcing layer 12) positioned farther to the inner side than the carcass layer 4 and the thickness Ga on the rim check line position of the outer side rubber portion is such that $0.7 \times Ga \leq Gc \leq 1.0 \times Ga$. The thickness Ga of the outer side rubber portion and the thickness Gc of the inner side rubber portion are thicknesses measured along a normal line of the tire outer surface (a virtual plane excluding the rim check line 19) on the rim check line position, respectively, and are thicknesses from the carcass surface to the tire outer surface or the tire inner surface. Furthermore, the maximum thickness Gb of the outer side rubber portion is a thickness measured along a normal line of the carcass layer 4 and is a thickness from the carcass surface to the tire outer surface.

Setting the thickness Ga on the rim check line position of the outer side rubber portion positioned farther to the outer side than the carcass layer 4 in this manner to be sufficiently great relative to the maximum thickness Gb in the side wall portion 2 of the outer side rubber portion thereof allows local stress concentration on the carcass cords configuring the carcass layer 4 to be avoided, and rupture of the carcass cords in the rim cushion portion to be prevented. The durability during run-flat traveling can be thereby improved. In addition, because increasing the thickness Ga on the rim check line position of the outer side rubber portion reduces shock and vibration transferred from the tire through the rim, an effect of enhancing the ride comfort during regular traveling can also be obtained.

Here, when the thickness Ga on the rim check line position of the outer side rubber portion positioned farther to the outer side than the carcass layer 4 is less than 0.8×Gb, the durability during run-flat traveling and the ride comfort during regular traveling are reduced, and conversely, when the thickness Ga is greater than 1.0×Gb, the durability is reduced because the carcass line becomes forced and the rubber volume in that location becomes than necessary.

Furthermore, setting the thickness Gc on the rim check line position of the inner side rubber portion positioned farther to the inner side than the carcass layer 4 to be sufficiently great relative to the thickness Ga on the rim check line position of the outer side rubber portion can reduce shear stress at work in the carcass layer 4, and improve the durability during run-flat traveling. Furthermore, when the thickness Gc on the rim check line position of the inner side rubber portion is made larger, the rubber volume of a location at which deformation caused by input from the rim is large is sufficiently secured, and thus an effect is obtained of improving the ride comfort during regular traveling.

Here, when the thickness Gc on the rim check line position of the inner side rubber portion positioned farther to the inner side than the carcass layer 4 is less than 0.7×Ga, the durability during run-flat traveling is reduced, and conversely, when the thickness Gc is greater than 1.0×Ga, the durability is reduced because the carcass line becomes forced and the rubber volume in that location becomes greater than necessary.

In the above run-flat tire, as illustrated in FIG. 1 and in FIG. 3, a minimum wall thickness portion 16 where the tire wall thickness is a minimum value in a range from a center position P1 of the tread portion 1 to a tire maximum width position P2 is disposed in a region X defined between an end portion of each of the belt layers 9 and a position at 70% of a tire cross-sectional height SH. A relationship between a thickness Gmin of the minimum wall thickness portion 16 and a thickness Gmax of a maximum wall thickness portion 17 where the tire wall thickness is a maximum value in the side wall portion 2 is such that $0.5 \times Gmax \leq Gmin \leq 0.8 \times Gmax$. The thickness Gmin of the minimum wall thickness portion 16 and the thickness Gmax of the maximum wall thickness portion 17 are thicknesses measured along a normal line of the tire inner surface, respectively, and are thicknesses from the tire inner surface to a tire outer surface. Furthermore, a relationship between a length Lmin on the tire outer surface on the tire meridian cross-section of a thin wall region 18 where the wall thickness difference with the minimum wall thickness portion 16 is 1 mm or less and the tire cross-sectional height SH is such that $0.18 \times SH \leq Lmin \leq 0.26 \times SH$.

Arranging the minimum wall thickness portion 16 in a range from the center position P1 of the tread portion 1 to the tire maximum width position P2 in this manner between the end portion of each of the belt layers 9 and the position at 70% of the tire cross-sectional height SH and forming the thin wall region 18 associated therewith improves the ride comfort during regular traveling and prevents buckling of the tread portion 1 during run-flat traveling, and furthermore, proactively deflecting a buttress portion that includes the minimum wall thickness portion 16 during run-flat traveling can reduce strain of the rim cushion on which a rim flange abuts. An effect of simultaneously improving the ride comfort during regular traveling and the durability during run-flat traveling can be thereby achieved.

Here, when the thickness Gmin of the minimum wall thickness portion 16 is less than 0.5×Gmax, the durability during run-flat traveling is reduced, and conversely, when the thickness Gmin is greater than 0.8×Gmax, the ride comfort during regular traveling is reduced. Furthermore, when the length Lmin of the thin wall region 18 where the wall thickness difference with the minimum wall thickness portion 16 is 1 mm or less is less than 0.18×SH, the ride comfort during regular traveling is reduced, and conversely, when the length Lmin is greater than 0.26×SH, the durability during run-flat traveling is reduced.

In the run-flat tire described above, it is preferred that a tan δ of a rubber composition composing the side reinforcing layer 12 is from 0.01 to 0.08 at 60° C. and that a JIS-A hardness of the rubber composition composing the side reinforcing layer 12 is from 68 to 80 at 20° C. When the tan δ of the rubber composition of the side reinforcing layer 12 is too low, there is a disadvantage from a productivity and cost perspective, and conversely, when the tan δ is too great, the durability during run-flat traveling is reduced. When the rubber composition of the side reinforcing layer 12 is too soft, the durability during run-flat traveling is reduced, and conversely, when the rubber composition is too hard, the ride comfort during regular traveling is degraded.

Furthermore, it is preferred that a tan δ of a rubber composition composing the bead filler 6 is from 0.03 to 0.08 at 60° C. and that a JIS-A hardness of the rubber composition composing the bead filler 6 is from 68 to 74 at 20° C. When the tan δ of the rubber composition of the bead filler 6 is too low, there is a disadvantage from a productivity and cost perspective, and conversely, when the tan δ is too great, the durability during run-flat traveling is reduced. When the rubber composition of the bead filler 6 is too soft, the durability during run-flat traveling is reduced, and conversely, when the rubber composition is too hard, the ride comfort during regular traveling is degraded.

In the above-described pneumatic tire, when the additional reinforcing layer 15 is embedded in the outside of the carcass layer 4 in the side wall portion 2, it is possible to further improve the durability during run-flat traveling. It is preferred that a tan δ of a rubber composition composing the additional reinforcing layer 15 is from 0.01 to 0.08 at 60° C. and that a JIS-A hardness of the rubber composition composing the additional reinforcing layer 15 is from 68 to 80 at 20° C. When the tan δ of the rubber composition of the additional reinforcing layer 15 is too low, there is a disadvantage from a productivity and cost perspective, and conversely, when the tan δ is too great, durability during run-flat traveling is reduced. When the rubber composition of the additional reinforcing layer 15 is too soft, the durability during run-flat traveling is reduced, and conversely, when the rubber composition is too hard, the ride comfort during regular traveling is degraded.

As illustrated in FIG. 1, the belt cover layer 10 is disposed on the outer peripheral side of the belt layer 9, and it is preferred that composite fiber cords of low elasticity yarn and high elasticity yarn having a mutually different elastic modulus are twisted together as the reinforcing cord of the belt cover layer 10. Configuring the belt cover layer 10 with composite fiber cords where a low elasticity yarn and a high elasticity yarn having a mutually different elastic modulus are twisted together in this manner allow the weakness of the low elasticity fiber cord where recovery of strain is difficult in conjunction with generated heat build-up at high temperature and the weakness of the high elasticity fiber cord that is inferior in compression fatigue resistance and adhesive strength to complement each other. As a result, buckling of the tread portion 1 during run-flat traveling is prevented, thereby enhancing durability. Furthermore, adding this type of belt cover layer 10 increases the rigidity of the tread portion 1, thereby also improving the steering stability and the ride comfort during regular traveling.

EXAMPLES

Tires were prepared in that, the tire size was 235/50R18, a single carcass layer was mounted between a pair of bead portions, the carcass layer was wound from the tire inner side to the tire outer side around the bead core of each of the bead portions, the bead filler was disposed on the outer peripheral side of each bead core in the bead portion, two belt layers were disposed on the outer peripheral side of the carcass layer in the tread portion, and a belt cover layer was disposed on the outer peripheral side of these belt layers. A side reinforcing layer having a falcated cross-sectional shape was disposed between the carcass layer and the inner liner layer in the side wall portion, and the additional reinforcing layer was embedded farther to the outer side than the carcass layer. At the same time, in the run-flat tire having a designated mounting direction on a vehicle, the tires for Conventional Example, Comparative Examples 1 to 6 and Working Examples 1 to 4 were prepared with the relationship between the distance Do from the center position of the circumferential primary groove positioned outermost in the tire width direction in the vehicle outer side region to the tire equatorial plane and the rim width Wr, the relationship between the distance Di from the center position of the circumferential primary groove positioned outermost in the tire width direction in the vehicle inner side region to the tire equatorial plane and the rim width Wr, the relationship between the groove width Wo of the circumferential primary groove positioned outermost in the tire width direction in the vehicle outer side region and the groove width Wi of the circumferential primary groove positioned outermost in the tire width direction in the vehicle inner side region, the thickness Ga on the rim check line position of the outer side rubber portion, the maximum thickness Gb in the side wall portion of the outer side rubber portion, the relationship between the thickness Ga and the maximum thickness Gb, the thickness Gc on the rim check line position of the inner side rubber portion, the relationship between the thickness Ga and the thickness Gc, a thickness Gmin of a minimum wall thickness portion, a thickness Gmax of a maximum wall thickness portion, the length Lmin of the thin wall region, the relationship between the tire cross-sectional height SH and the length Lmin of the thin wall region, the tan δ of each rubber composition configuring the bead filler and the additional reinforcing layer at 60° C. and the JIS-A hardness at 20° C. set as indicated in Table 1.

In Table 1, the tan δ of the bead filler is listed as "tan δ [BFL]", the JIS-A hardness of the bead filler is listed as "Hs [BFL]", the tan δ of the additional reinforcing layer is listed as "tan δ [2FL]", and the JIS-A hardness of the additional reinforcing layer is listed as "Hs [2FL]".

Run-flat durability, ride comfort, and steering stability were evaluated for these test tires according to the following evaluation methods, and the results thereof are also shown in Table 1.

Run-Flat Durability:

Each test tire was assembled on a wheel with a rim size of 18×7.5J, mounted on a test vehicle, and inflated to an air pressure of 230 kPa, except for the right side drive axle tire whose valve core was removed, and the vehicle was run on an asphalt road surface test course at an average speed of 80 km/h. Running was continued until a driver felt vibration caused by the breakdown of the tire and the running distance was measured. Such measurement was performed by three test drivers, and the average running distance was found. The evaluation results were indicated by index while the result of Conventional Example was indexed at 100. Larger index values indicate superior run-flat durability.

Ride Comfort:

Each test tire was assembled on the wheel with a rim size of 18×7.5J, mounted on the test vehicle, and inflated to the air pressure of 230 kPa. The vehicle was run on the asphalt road surface test course at the average speed of 80 km/h, and a sensory evaluation was conducted by the driver. Such evaluation was performed by three test drivers, and the average evaluation values were found. The evaluation results were indicated by index while the result of Conventional Example was indexed at 100. Larger index values indicate superior ride comfort.

Steering Stability:

Each test tire was assembled on the wheel with a rim size of 18×7.5J, mounted on the test vehicle, and inflated to the air pressure of 230 kPa. The vehicle was run on the asphalt road surface test course at the average speed of 80 km/h, and a sensory evaluation was conducted by the driver. Such evaluation was performed by three test drivers, and the average evaluation values were found. The evaluation results were indicated by index while the result of Conventional Example was indexed at 100. Larger index values indicate superior steering stability.

TABLE 1

|  | Conventional Example 1 | Comparative Example 1 | Comparative Example 2 | Comparative Example 3 |
|---|---|---|---|---|
| Do/Wr | 0.28 | 0.25 | 0.25 | 0.19 |
| Di/Wr | 0.25 | 0.30 | 0.30 | 0.24 |
| Wo (mm) | 12.0 | 11.5 | 11.5 | 11.5 |
| Wi (mm) | 12.0 | 13.3 | 13.3 | 13.3 |
| Wo/Wi | 1.00 | 0.87 | 0.87 | 0.87 |
| Gb (mm) | 6.5 | 6.5 | 8.2 | 8.2 |
| Ga (mm) | 5.0 | 5.0 | 7.9 | 7.9 |
| Ga/Gb | 0.77 | 0.77 | 0.96 | 0.96 |
| Gc (mm) | 3.0 | 3.0 | 3.0 | 6.0 |
| Gc/Ga | 0.60 | 0.60 | 0.60 | 0.76 |
| Gmin (mm) | 16 | 16 | 16 | 16 |
| Gmax (mm) | 17.8 | 17.8 | 17.8 | 17.8 |
| Gmin/Gmax | 0.90 | 0.90 | 0.90 | 0.90 |
| Lmin (mm) | 5 | 5 | 5 | 5 |
| Lmin/SH | 0.043 | 0.043 | 0.043 | 0.043 |
| Hs [BFL] | 90 | 90 | 90 | 90 |
| tan δ [BFL] | 0.15 | 0.15 | 0.15 | 0.15 |

TABLE 1-continued

|  | | | | |
|---|---|---|---|---|
| Hs [2FL] | 90 | 90 | 90 | 90 |
| tan δ [2FL] | 0.15 | 0.15 | 0.15 | 0.15 |
| Run-flat durability | 100 | 100 | 103 | 101 |
| Ride comfort | 100 | 100 | 99 | 103 |
| Steering stability | 100 | 103 | 105 | 103 |

|  | Comparative Example 4 | Comparative Example 5 | Comparative Example 6 |
|---|---|---|---|
| Do/Wr | 0.31 | 0.25 | 0.25 |
| Di/Wr | 0.36 | 0.30 | 0.30 |
| Wo (mm) | 11.5 | 11.0 | 12.0 |
| Wi (mm) | 13.3 | 13.9 | 12.0 |
| Wo/Wi | 0.87 | 0.79 | 1.00 |
| Gb (mm) | 8.2 | 8.2 | 8.2 |
| Ga (mm) | 7.9 | 7.9 | 7.9 |
| Ga/Gb | 0.96 | 0.96 | 0.96 |
| Gc (mm) | 6.0 | 6.0 | 6.0 |
| Gc/Ga | 0.76 | 0.76 | 0.76 |
| Gmin (mm) | 16 | 16 | 16 |
| Gmax (mm) | 17.8 | 17.8 | 17.8 |
| Gmin/Gmax | 0.90 | 0.90 | 0.90 |
| Lmin (mm) | 5 | 5 | 5 |
| Lmin/SH | 0.043 | 0.043 | 0.043 |
| Hs [BFL] | 90 | 90 | 90 |
| tan δ [BFL] | 0.15 | 0.15 | 0.15 |
| Hs [2FL] | 90 | 90 | 90 |
| tan δ [2FL] | 0.15 | 0.15 | 0.15 |
| Run-flat durability | 101 | 101 | 101 |
| Ride comfort | 103 | 103 | 103 |
| Steering stability | 103 | 103 | 103 |

|  | Working Example 1 | Working Example 2 | Working Example 3 | Working Example 4 |
|---|---|---|---|---|
| Do/Wr | 0.25 | 0.25 | 0.25 | 0.25 |
| Di/Wr | 0.30 | 0.30 | 0.30 | 0.30 |
| Wo (mm) | 11.5 | 11.5 | 11.5 | 11.5 |
| Wi (mm) | 13.3 | 13.3 | 13.3 | 13.3 |
| Wo/Wi | 0.87 | 0.87 | 0.87 | 0.87 |
| Gb (mm) | 8.2 | 8.2 | 8.2 | 8.2 |
| Ga (mm) | 7.9 | 7.9 | 7.9 | 7.9 |
| Ga/Gb | 0.96 | 0.96 | 0.96 | 0.96 |
| Gc (mm) | 6.0 | 6.0 | 6.0 | 6.0 |
| Gc/Ga | 0.76 | 0.76 | 0.76 | 0.76 |
| Gmin (mm) | 16 | 12.2 | 12.2 | 12.2 |
| Gmax (mm) | 17.8 | 17.8 | 17.8 | 17.8 |
| Gmin/Gmax | 0.90 | 0.69 | 0.69 | 0.69 |
| Lmin (mm) | 5 | 25 | 25 | 25 |
| Lmin/SH | 0.043 | 0.216 | 0.216 | 0.216 |
| Hs [BFL] | 90 | 90 | 70 | 70 |
| tan δ [BFL] | 0.15 | 0.15 | 0.03 | 0.03 |
| Hs [2FL] | 90 | 90 | 90 | 70 |
| tan δ [2FL] | 0.15 | 0.15 | 0.15 | 0.03 |
| Run-flat durability | 106 | 110 | 112 | 116 |
| Ride comfort | 104 | 108 | 112 | 114 |
| Steering stability | 106 | 105 | 104 | 103 |

As evident from Table 1, the tires in the Working Examples 1 to 4, in contrast to those of the Conventional Example, concurrently demonstrated a high degree of improvement in the durability during run-flat traveling and the ride comfort during regular traveling, and moreover, demonstrated excellent steering stability. In contrast to this, although the tires in the Comparative Examples 1 to 6 demonstrated partial improvement results for the durability during run-flat traveling, the ride comfort and the steering stability such improvement results were not necessarily sufficient.

Next, tires of Working Examples 5 to 12 were prepared, having the same structure as those of the Working Example 4 apart from the following being set as indicated in Table 2: the thickness Gmin of the minimum wall thickness portion, the thickness Gmax of the maximum wall thickness portion, the length Lmin of the thin wall region, the relationship between the tire cross-sectional height SH and the length Lmin of the thin wall region, the tan δ of each rubber composition configuring the bead filler and the additional reinforcing layer at 60° C., and the JIS-A hardness at 20° C.

Run-flat durability, ride comfort, and steering stability were evaluated for these test tires according to the following evaluation methods, and the results thereof are also shown in Table 2.

TABLE 2

|  | Working Example 5 | Working Example 6 | Working Example 7 | Working Example 8 |
|---|---|---|---|---|
| Do/Wr | 0.25 | 0.25 | 0.25 | 0.25 |
| Di/Wr | 0.30 | 0.30 | 0.30 | 0.30 |
| Wo (mm) | 11.5 | 11.5 | 11.5 | 11.5 |
| Wi (mm) | 13.3 | 13.3 | 13.3 | 13.3 |
| Wo/Wi | 0.87 | 0.87 | 0.87 | 0.87 |
| Gb (mm) | 8.2 | 8.2 | 8.2 | 8.2 |
| Ga (mm) | 7.9 | 7.9 | 7.9 | 7.9 |
| Ga/Gb | 0.96 | 0.96 | 0.96 | 0.96 |
| Gc (mm) | 6.0 | 6.0 | 6.0 | 6.0 |
| Gc/Ga | 0.76 | 0.76 | 0.76 | 0.76 |
| Gmin (mm) | 8.9 | 14.2 | 12.2 | 12.2 |
| Gmax (mm) | 17.8 | 17.8 | 17.8 | 17.8 |
| Gmin/Gmax | 0.50 | 0.80 | 0.69 | 0.69 |
| Lmin (mm) | 25 | 25 | 20.8 | 30.1 |
| Lmin/SH | 0.216 | 0.216 | 0.18 | 0.26 |
| Hs [BFL] | 70 | 70 | 70 | 70 |
| tan δ [BFL] | 0.03 | 0.03 | 0.03 | 0.03 |
| Hs [2FL] | 70 | 70 | 70 | 70 |
| tan δ [2FL] | 0.03 | 0.03 | 0.03 | 0.03 |
| Run-flat durability | 114 | 118 | 118 | 114 |
| Ride comfort | 116 | 112 | 112 | 116 |
| Steering stability | 103 | 103 | 103 | 103 |

|  | Working Example 9 | Working Example 10 | Working Example 11 | Working Example 12 |
|---|---|---|---|---|
| Do/Wr | 0.25 | 0.25 | 0.25 | 0.25 |
| Di/Wr | 0.30 | 0.30 | 0.30 | 0.30 |
| Wo (mm) | 11.5 | 11.5 | 11.5 | 11.5 |
| Wi (mm) | 13.3 | 13.3 | 13.3 | 13.3 |
| Wo/Wi | 0.87 | 0.87 | 0.87 | 0.87 |
| Gb (mm) | 8.2 | 8.2 | 8.2 | 8.2 |
| Ga (mm) | 7.9 | 7.9 | 7.9 | 7.9 |
| Ga/Gb | 0.96 | 0.96 | 0.96 | 0.96 |
| Gc (mm) | 6.0 | 6.0 | 6.0 | 6.0 |
| Gc/Ga | 0.76 | 0.76 | 0.76 | 0.76 |
| Gmin (mm) | 12.2 | 12.2 | 12.2 | 12.2 |
| Gmax (mm) | 17.8 | 17.8 | 17.8 | 17.8 |
| Gmin/Gmax | 0.69 | 0.69 | 0.69 | 0.69 |
| Lmin (mm) | 25 | 25 | 25 | 25 |
| Lmin/SH | 0.216 | 0.216 | 0.216 | 0.216 |
| Hs [BFL] | 68 | 74 | 70 | 70 |
| tan δ [BFL] | 0.03 | 0.08 | 0.03 | 0.03 |
| Hs [2FL] | 70 | 70 | 68 | 80 |
| tan δ [2FL] | 0.03 | 0.03 | 0.01 | 0.08 |
| Run-flat durability | 117 | 115 | 117 | 115 |
| Ride comfort | 115 | 113 | 115 | 113 |
| Steering stability | 102 | 104 | 102 | 104 |

As evident from Table 2, the tires in the Working Examples 5 to 12, in a similar manner to those of the Working Examples 1 to 4 and in contrast to those of the Conventional Example, concurrently demonstrated a high degree of improvement in the durability during run-flat traveling and the ride comfort during regular traveling, and moreover, demonstrated excellent steering stability.

The invention claimed is:

1. A run-flat tire having a designated mounting direction on a vehicle, the run-flat tire comprising:
an annular-shaped tread portion extending in a tire circumferential direction;
a pair of side wall portions disposed on both sides of the tread portion;
a pair of bead portions disposed on inner sides in a tire radial direction of the side wall portions;
at least one carcass layer mounted between the pair of bead portions, the carcass layer being wound from a tire inner side to a tire outer side around a bead core of each of the bead portions;
a bead filler disposed on an outer peripheral side of each bead core in each of the bead portions;
a plurality of belt layers disposed on an outer peripheral side of the carcass layer in the tread portion; and
a side reinforcing layer having a falcated cross-sectional shape disposed between the carcass layer and an inner liner layer in the side wall portion;
at least one circumferential primary groove that extends in the tire circumferential direction being disposed, respectively, in a vehicle outer side region and a vehicle inner side region of the tread portion that is divided with a tire equatorial plane as a boundary;
a relationship between a distance Do from a center position of the circumferential primary groove positioned outermost in a tire width direction in the vehicle outer side region to the tire equatorial plane and a rim width Wr being such that $0.20 \leq Do/Wr \leq 0.30$;
a relationship between a distance Di from a center position of a circumferential primary groove positioned outermost in a tire width direction in the vehicle inner side region to the tire equatorial plane and the rim width Wr being such that $0.25 \leq Di/Wr \leq 0.35$;
a relationship between a groove width Wo of the circumferential primary groove positioned outermost in the tire width direction in the vehicle outer side region and a groove width Wi of the circumferential primary groove positioned outermost in the tire width direction in the vehicle inner side region being such that $0.80 \leq Wo/Wi \leq 0.90$;
a relationship between a thickness Ga on a rim check line position of an outer side rubber portion positioned farther to the outer side than the carcass layer and a maximum thickness Gb in the side wall portion of the outer side rubber portion being such that $0.8 \times Gb \leq Ga \leq 1.0 \times Gb$; and
a relationship between a thickness Gc on a rim check line position of an inner side rubber portion positioned farther to the inner side than the carcass layer and the thickness Ga on the rim check line position of the outer side rubber portion being such that $0.7 \times Ga \leq Gc \leq 1.0 \times Ga$;
wherein a minimum wall thickness portion in a range from a center position of the tread portion to a tire maximum width position is disposed between an end portion of the belt layers and a position at 70% of a tire cross-sectional height SH, a relationship between a thickness Gmin of the minimum wall thickness portion and a thickness Gmax of a maximum wall thickness portion in the side wall portion is such that $0.5 \times Gmax \leq Gmin \leq 0.8 \times Gmax$, and a relationship between a length Lmin on a tire outer surface in a tire meridian cross-section of a thin wall region where a wall thickness difference to the minimum wall thickness portion is 1 mm or less and the tire cross-sectional height SH is such that $0.18 \times SH \leq Lmin \leq 0.26 \times SH$.

2. The run-flat tire according to claim 1, wherein a tan δ of a rubber composition composing the bead filler is from 0.03 to 0.08 at 60° C., and a JIS-A hardness of the rubber composition composing the bead filler is from 68 to 74 at 20° C.

3. The run-flat tire according to claim 2, wherein an additional reinforcing layer is embedded in the outside of the carcass layer in the side wall portion, a tan δ of a rubber composition composing the additional reinforcing layer is from 0.01 and 0.08 at 60° C., and a JIS-A hardness of the rubber composition composing the additional reinforcing layer is from 68 and 80 at 20° C.

4. The run-flat tire according to claim 3, wherein a relationship between the distance Do and the distance Di is such that Di>Do.

5. The run-flat tire according to claim 2, wherein a relationship between the distance Do and the distance Di is such that Di>Do.

6. The run-flat tire according to claim 2, wherein an additional reinforcing layer is embedded in the outside of the carcass layer in the side wall portion, a tan δ of a rubber composition composing the additional reinforcing layer is from 0.01 and 0.08 at 60° C., and a JIS-A hardness of the rubber composition composing the additional reinforcing layer is from 68 and 80 at 20° C.

7. The run-flat tire according to claim 6, wherein a relationship between the distance Do and the distance Di is such that Di>Do.

8. The run-flat tire according to claim 1, wherein an additional reinforcing layer is embedded in the outside of the carcass layer in the side wall portion, a tan δ of a rubber composition composing the additional reinforcing layer is from 0.01 and 0.08 at 60° C., and a JIS-A hardness of the rubber composition composing the additional reinforcing layer is from 68 and 80 at 20° C.

9. The run-flat tire according to claim 1, wherein a relationship between the distance Do and the distance Di is such that Di>Do.

* * * * *